(12) United States Patent
Osebold, III

(10) Patent No.: US 12,528,200 B2
(45) Date of Patent: Jan. 20, 2026

(54) LIGHT FOR TEACH PENDANT

(71) Applicant: Francis Joseph Osebold, III, Clinton Township, MI (US)

(72) Inventor: Francis Joseph Osebold, III, Clinton Township, MI (US)

( * ) Notice: Subject to any disclaimer, the term of this patent is extended or adjusted under 35 U.S.C. 154(b) by 807 days.

(21) Appl. No.: 17/565,619

(22) Filed: Dec. 30, 2021

(65) Prior Publication Data

US 2023/0211506 A1   Jul. 6, 2023

(51) Int. Cl.
*B25J 13/06* (2006.01)
*B25J 13/00* (2006.01)
*B25J 19/06* (2006.01)

(52) U.S. Cl.
CPC .............. *B25J 13/06* (2013.01); *B25J 13/006* (2013.01); *B25J 19/061* (2013.01)

(58) Field of Classification Search
CPC ......... B25J 13/06; B25J 13/006; B25J 19/061
See application file for complete search history.

(56) References Cited

U.S. PATENT DOCUMENTS

| | | | | |
|---|---|---|---|---|
| 6,050,696 A * | 4/2000 | Radley | ................ | F21V 33/0052 362/85 |
| 6,332,102 B1 * | 12/2001 | Nakajima | ................ | B25J 13/06 318/568.19 |
| 8,185,136 B2 * | 5/2012 | Tanaka | ................ | H04M 1/6058 455/410 |
| 9,033,539 B2 * | 5/2015 | Chien | ................ | F21L 4/08 362/276 |
| 10,081,109 B2 | 9/2018 | Kowalski et al. | | |
| 10,430,726 B2 | 10/2019 | Sugiyama | | |
| 10,766,135 B2 | 9/2020 | Jemura et al. | | |
| 2002/0193908 A1 * | 12/2002 | Parker | ................ | G06N 3/008 700/258 |
| 2016/0031078 A1 * | 2/2016 | Kapoor | ................ | B25J 9/0081 700/258 |
| 2017/0028557 A1 | 2/2017 | Battisti | | |

(Continued)

FOREIGN PATENT DOCUMENTS

| | | | |
|---|---|---|---|
| JP | 4990504 B2 | * | 8/2012 |
| JP | 2012223859 A | * | 11/2012 |

(Continued)

OTHER PUBLICATIONS

Machine translation for JP-4990504-B2, obtained Aug. 2024 (Year: 2024).*

(Continued)

*Primary Examiner* — Robert E Fennema
*Assistant Examiner* — Vi N Tran
(74) *Attorney, Agent, or Firm* — Darrow Mustafa PC

(57) ABSTRACT

A teach pendant can be communicatively coupled to a light. The teach pendant can be communicatively coupled to a robot. The teach pendant can include one or more processors. The teach pendant can be configured to control the light. For instance, the teach pendant can be configured to selectively activate and deactivate the light. The light can be operatively connected to the teach pendant or the robot. The light can help robot programmers or technicians see in dark or dimly lit work environments. The light can improve user safety in such environments and/or enhance the work environment.

19 Claims, 5 Drawing Sheets

(56) References Cited

U.S. PATENT DOCUMENTS

| | | | |
|---|---|---|---|
| 2018/0071913 A1 | 3/2018 | Matsudaira et al. | |
| 2018/0288295 A1* | 10/2018 | Scepanovic | H04N 23/631 |
| 2020/0191368 A1* | 6/2020 | Reed | H04M 1/22 |
| 2020/0376680 A1* | 12/2020 | Wang | B25J 5/007 |
| 2020/0391394 A1* | 12/2020 | Chung | H05B 45/20 |
| 2021/0041846 A1* | 2/2021 | Horiguchi | G01D 5/2448 |
| 2024/0103260 A1* | 3/2024 | Ootsuki | G02B 21/0012 |

FOREIGN PATENT DOCUMENTS

| | | | |
|---|---|---|---|
| KR | 2004-0016777 A * | 2/2004 | |
| SE | 2050588 A1 | 6/2020 | |

OTHER PUBLICATIONS

Machine Translation for JP-2012223859-A, obtained Apr. 2025 (Year: 2025).*
Machine Translation for KR20040016777A, obtained Apr. 2025 (Year: 2025).*
Machine Translation for JP-4990504-B2, obtained Apr. 2025 (Year: 2025).*

* cited by examiner

LIGHT FOR TEACH PENDANT

FIELD

The subject matter described herein relates in general to robots and, more particularly, to teach pendants for robots.

BACKGROUND

In certain work environments, such as in industrial settings, robots are used to perform various functions. A user may communicate with the robot by using a teach pendant. The teach pendant can include a user interface that enables a user to interact with, program, and troubleshoot issues with the robot. The teach pendant can provide a user access to information about the robot, including process information, faults, and alarms.

SUMMARY

In one respect, the present disclosure is directed to a teach pendant system. The system can include a teach pendant. The teach pendant can include one or more processors. The system can include a light. The light can be operatively connected to the teach pendant. The teach pendant can be communicatively coupled to selectively activate and deactivate the light.

In another respect, the present disclosure is directed to a method for a teach pendant. The method include receiving, on the teach pendant, a light activation input from a user. The method can include, responsive to receiving the light activation input, causing a light to be activated. The light can be located on the teach pendant or on a robot communicatively coupled to the teach pendant.

In still another respect, the present disclosure is directed to a robot system. The system can include a robot and a light. The light can be operatively connected to the robot. The light can be communicatively coupled to a teach pendant. The light can be configured to be selectively activated and deactivated by the teach pendant.

DETAILED DESCRIPTION

Figure 1:
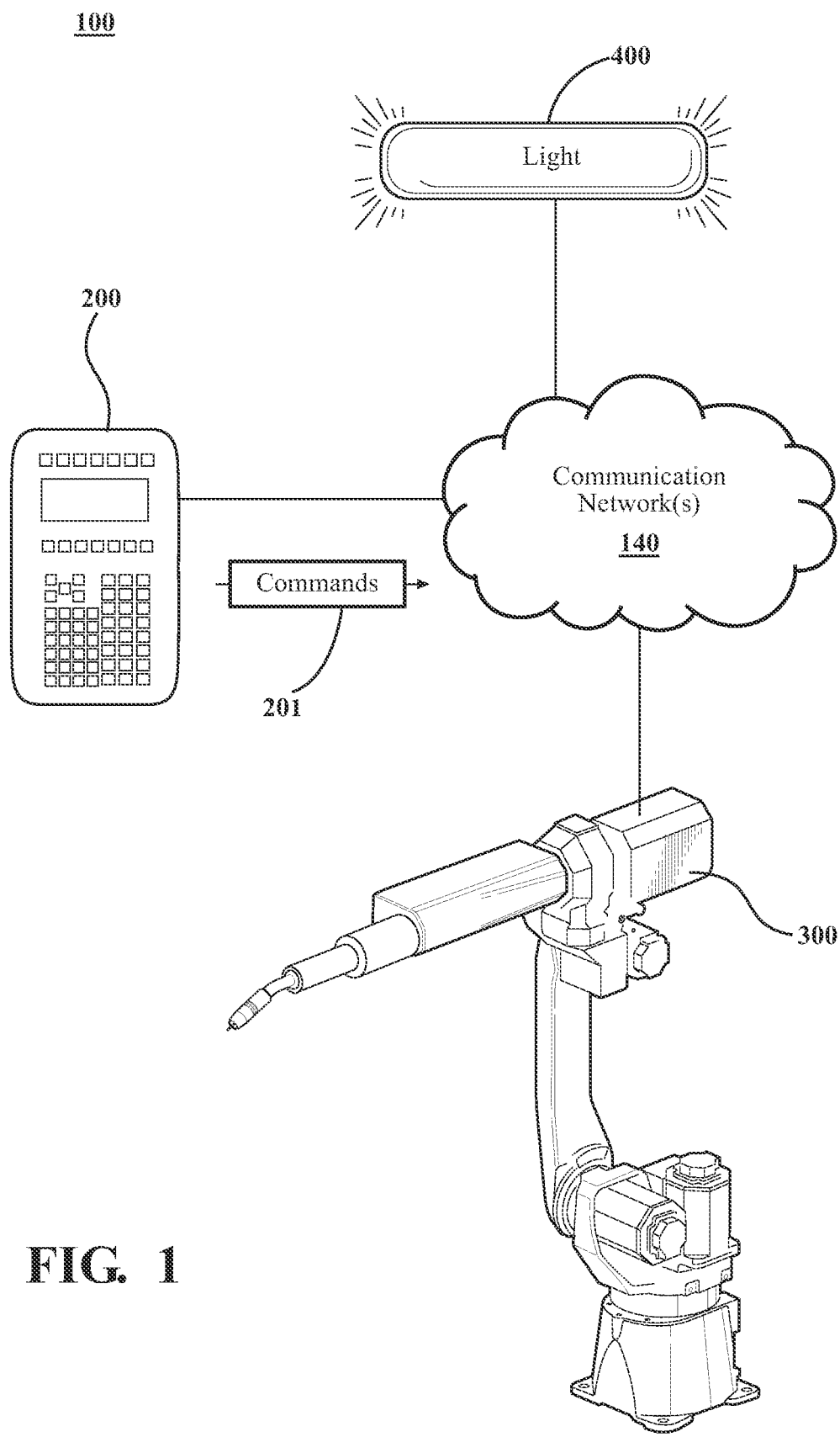
FIG. 1 is an example of a teach pendant light system.

Some work environments in which robots are used can be dimly lighted or even unlighted. As a result, a robot technician (operator, programmer, repair, maintenance, etc.) may have to work in very dark settings. Such settings can make work difficult, cumbersome, and/or even hazardous.

According to arrangements described herein, a light can be provided in connection with a teach pendant and/or a robot controlled by the teach pendant. By providing such a light, a user can illuminate a work area or a desired portion thereof. Thus, working environment conditions and/or safety can be improved.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of at least a portion of a teach pendant light system 100 is shown. Some of the possible elements of the teach pendant light system 100 are shown in FIG. 1 and will now be described. It will be understood that it is not necessary for the teach pendant light system 100 to have all of the elements shown in FIG. 1 or described herein. The teach pendant light system 100 can include one or more teach pendants 200, one or more robots 300, and/or one or more lights 400.

In some arrangements, the light(s) 400 can be fixed or substantially permanently attached to the teach pendant(s) 200 and/or the robot(s) 300. In such case, the light(s) 400 cannot be readily separated from the teach pendant(s) 200 and/or the robot(s) 300. For instance, the teach pendant(s) 200 and/or the robot(s) 300 may have to be at least partially disassembled to remove the light(s) 400. In some arrangements, the light(s) 400 can be movable on the teach pendant(s) 200 and/or the robot(s) 300 while remaining attached thereto. For instance, the light(s) 400 can be configured to swivel while attached to the teach pendant(s) 200 and/or the robot(s) 300. In some arrangements, the light(s) 400 can be configured to swivel 360 degrees. Such movement can allow the user to direct light in desired areas while holding the teach pendant(s) 200 in a desired orientation. However, other types of motion are possible, such as rotation, translation, pivoting, substantially hemispherical, bending, and/or any combination thereof, just to name a few possibilities. It should be noted that, at least in some arrangements, the light(s) 400 are not part of another device of the teach pendant(s) 200 and/or the robot(s) 300. For instance, the light(s) 400 are not part of a camera of the teach pendant(s) 200 and/or the robot(s) 300.

In some arrangements, the light(s) 400 can be removable from the teach pendant(s) 200, and/or the robot(s) 300. In such case, the light(s) 400 can be usable independently from the teach pendant(s) 200 and/or the robot(s) 300. For instance, the light(s) 400 can be used as a flashlight, a lantern, or a spotlight. A user can place the light(s) 400 closer to where the user's needs are required to have additional light to see better. The light(s) 400 can be removably connected to the teach pendant(s) 200 and/or the robot(s) 300 in any suitable manner, such as by one or more fasteners (e.g., clips, straps, hook and loop fasteners, screws, ties, etc.), one or more magnets, one or more welds, one or more adhesives, one or more tapes (e.g., double sided tape), one or more forms of mechanical engagement (tongue and groove, snap on, etc.), and any combination thereof. Any suitable form of removable connection, now known or later developed, can be used between the light(s) 400 and the teach pendant(s) 200.

It should be noted that light(s) 400 can include one or more features to facilitate user carrying or holding of the light(s) 400. For instance, the light(s) 400 can include one or more ergonomic features, one or more handles, and/or one or more features to enable a user to wear the light(s) 400. For instance, the light(s) 400 can include one or more features to allow the user to wear the light(s) 400 like a headlight or as a necklace, bracelet, or lanyard. The light(s) 400 can include one or more fasteners to allow a user to attach the light(s) 400 to the body or to clothing. The light(s) 400 can include one or more straps to facilitate hand carrying. The light(s) 400 can include one or more features to allow the light(s) 400 to be hung in a desired location. Non-limiting examples of the one or more features include tethers, straps, hooks, clips, hinges, swivels, or any combination thereof. The one or more features can be any suitable structure, now known or later developed, that can enable the light(s) 400 to be hung in a desired location.

The light(s) 400 can include one or more features so that a user may place the light(s) 400 back in or onto the teach pendant(s) 200, the robot(s) 300, or some other location. In some arrangements, the light(s) 400, the teach pendant(s) 200, and/or the robot(s) 300 can be configured such that the light(s) 400 are to be placed back in or onto the teach pendant(s) 200 and/or the robot(s) 300 in order for a program to run. In such case, if the light(s) 400 are not placed back in or onto the teach pendant(s) 200 and/or the robot(s) 300, the program will not run or will be disabled or suspended. In some arrangements, the teach pendant(s) 200, and/or the robot(s) 300 can be configured such that the light(s) 400 do not need to be placed back in or onto the teach pendant(s) 200 and/or the robot(s) 300 in order for a program to run.

The light(s) 400 can be attached to any suitable portion of the teach pendant(s) 200 and/or the robot(s) 300. Various examples are provided herein. The light(s) 400 can be attached on or within the teach pendant(s) 200, a structure of the robot(s) 300, an arm of the robot(s) 300, work cells, and/or work cell fixtures.

In some arrangements, the light(s) 400 can be configured to be attached to a plurality of different portions of the teach pendant(s) 200 and/or the robot(s) 300. As an example, the light(s) 400 can be detached from one area of the teach pendant(s) 200 and attached to a different area of the teach pendant(s) 200 or back in the same spot from which the light(s) 400 were detached. In some arrangements, the light(s) 400 can be configured to be removably attached to both the teach pendant(s) 200 and to the robot(s) 300. Thus, if the light(s) 400 are attached to the teach pendant(s) 200, a user can detach the light(s) 400 from the teach pendant(s) 200 and attach the light(s) 400 to the robot(s) 300.

The various elements of the teach pendant light system 100 can be communicatively linked to each other (or any combination thereof) through one or more communication networks 140. As used herein, the term "communicatively linked" can include direct or indirect connections through a communication channel or pathway or another component or system. A "communication network" means one or more components designed to transmit and/or receive information from one source to another. One or more of the elements of the teach pendant light system 100 can include and/or execute suitable communication software, which enables the various elements to communicate with each other through the communication network and perform the functions disclosed herein.

The one or more communication networks 140 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The one or more communication networks 140 further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network(s) 140 can include wired communication links and/or wireless communication links. The communication network(s) 140 can include any combination of the above networks and/or other types of networks, now known or later developed.

Figure 2:
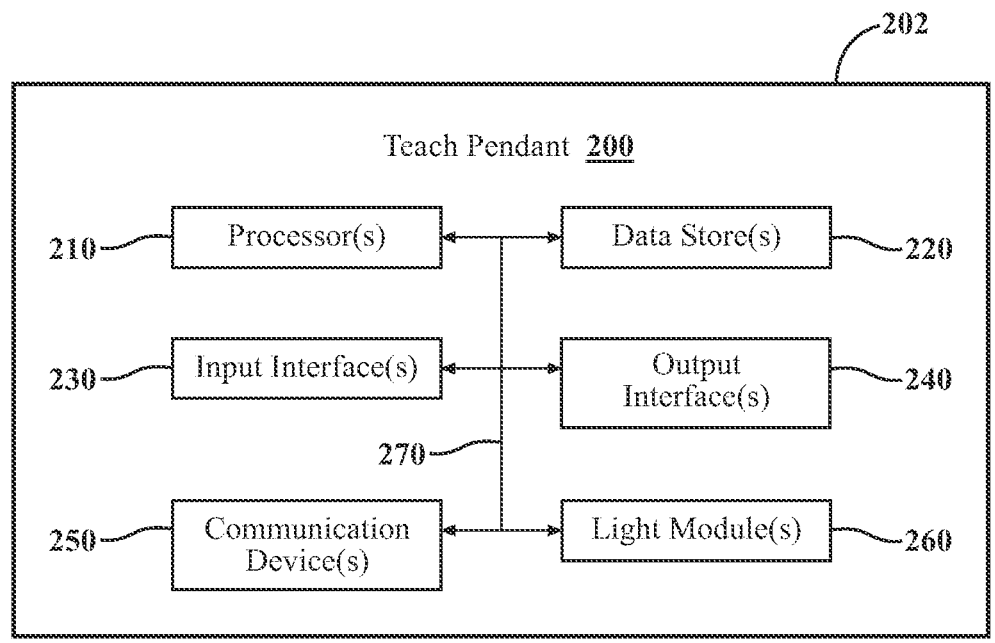
FIG. 2 is an example of a teach pendant.

Each of the above noted elements of the teach pendant light system 100 will be described in turn below. Referring to FIG. 2, an example of the teach pendant 200 is shown. The teach pendant 200 can be any type of teach pendant, now known or later developed. The teach pendant 200 can be configured to allow a user to interact with, communicate with, program, troubleshoot, and/or access the robot(s) 300. In some arrangements, the teach pendant 200 can be configured to allow a user to interact with, communicate with, program, troubleshoot, and/or access a specific robot. The teach pendant 200 can be a hand-held device and/or a device that can be worn or otherwise carried by the user in some manner.

Some of the possible elements of the teach pendant 200 are shown in FIG. 2 and will now be described. It will be understood that it is not necessary for the teach pendant 200 to have all of the elements shown in FIG. 2 or described herein. Further, the teach pendant 200 can have additional and/or alternative elements to those shown in FIG. 2. The teach pendant 200 can include one or more processors 210, one or more data stores 220, one or more input interfaces 230, one or more output interfaces 240, one or more communication devices 250, and one or more light modules 260. The various elements of the teach pendant 200 can be communicatively linked to each other (or any combination thereof) through one or more communication networks 270. The above discussion of the communication network(s) 140 in connection with FIG. 1 applies equally to the communication network(s) 270.

One or more of the elements of the teach pendant 200 can be located within a housing 202. The housing 202 can have any suitable, size, shape, and/or configuration. The housing 202 can be made of any suitable material.

Each of the above noted elements of the teach pendant 200 will be described in turn below. The teach pendant 200 can include one or more processors 210. "Processor" means any component or group of components that are configured to execute any of the processes described herein or any form of instructions to carry out such processes or cause such processes to be performed. The processor(s) 210 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 210 can include at least one hardware circuit (e.g., an integrated circuit) configured to carry out instructions contained in program code. In arrangements in which there is a plurality of processors 210, such processors can work independently from each other or one or more processors can work in combination with each other.

The teach pendant 200 can include one or more data stores 220 for storing one or more types of data. The data store(s) 220 can include volatile and/or non-volatile memory. Examples of suitable data stores 220 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 220 can be a component of the processor(s) 210, or the data store(s) 220 can be operatively connected to the processor(s) 210 for use thereby. The term "operatively connected," as used throughout this description, can include direct or indirect connections, including connections without direct physical contact.

The teach pendant 200 can include one or more input interfaces 230. An "input interface" includes any device, component, system, element or arrangement or groups thereof that enable information, data, instructions, and/or commands to be entered into a machine. The input interface(s) 230 can be configured to receive an input from a user. The input interface(s) 230 can include one or more user interface elements, including, for example, keyboard(s), keypad(s), display(s), touch screen(s), multi-touch screen(s), button(s), switch(s), dial(s), joystick(s), a mouse/mice, trackball(s), microphone(s), and/or combinations thereof. In one or more arrangements, the input interface(s) 230 can be configured to receive user inputs relating to the teach pendant 200, the robot(s) 300, and/or other things.

The teach pendant 200 can include one or more output interface(s) 240. An "output interface" includes any device, component, system, element or arrangement or groups thereof that enable information or data to be presented to a user (e.g., a person, an entity, etc.). Some components may serve as both a component of the input interface(s) 230 and a component of the output interface(s) 240. The output interface(s) 240 can include display(s), speaker(s), projector(s), any of the items noted above in connection with the input interface(s) 230, and/or combinations thereof.

The teach pendant 200 can include one or more communication devices 250. The communications device(s) 250 include any device, component, system, element or arrangement or groups thereof that enable wired and/or wireless communication between two or more devices, components, systems, elements, entities, or arrangements, or groups thereof. The communications device(s) 250 can communicate using any suitable communication technology. The communications device(s) 250 can include an antenna, a receiver, a transmitter, and/or a transceiver that can be tuned to communicate according to various communications protocols. For instance, the communications device(s) 250 can communicate via dedicated short range communications (DSRC) protocols. In one or more arrangements, the communications device(s) 250 can communicate via a cellular network, Bluetooth, Wi-Fi, etc. The communications device(s) 250 can communicate via any wireless technology, now known or developed in the future. The communication device(s) 250 can enable the teach pendant 200 to communicate with the robot 300 and/or the light 400.

The teach pendant 200 can include one or more modules. In one or more arrangements, the modules described herein can include artificial or computational intelligence elements, e.g., neural network, fuzzy logic or other machine learning algorithms. Further, in one or more arrangements, the modules can be distributed among a plurality of modules. In one or more arrangements, two or more of the modules described herein can be combined into a single module.

The teach pendant 200 can include one or more light modules 260. The light module(s) 260 can include profiles and logic for controlling the light 400 according to arrangements herein.

The light module(s) 260 can be configured to detect and/or receive user inputs (e.g., commands) provided on the input interface(s) 230 of the teach pendant 200. In some instances, the input interface(s) 230 can provide a menu or one or more user interface elements for a user to select to alter one or more aspects of the light 400, including any of the aspects described herein. The menu can be pre-programmed and/or can be user configurable.

The light module(s) 260 can be configured to determine when the light 400 should be activated or deactivated. For instance, the light module(s) 260 can be configured to detect and/or receive user inputs corresponding to light activation or light deactivation commands. In response, the light module(s) 260 can be configured to cause the light 400 to be activated or deactivated. As used herein, "cause" or "causing" means to make, force, compel, direct, command, instruct, and/or enable an event or action to occur or at least be in a state where such event or action may occur, either in a direct or indirect manner. The light module(s) 260 can be configured send control signals or commands over a communication network (e.g., the communication network(s) 140) to the light 400 or one or more components thereof.

The light module(s) 260 can be configured to determine when one or more output characteristics of the light 400 should be adjusted. For instance, the light module(s) 260 can be configured to detect and/or receive user inputs corresponding to an output characteristic adjustment command. In response, the light module(s) 260 can be configured to cause an output characteristic of the light 400 to be adjusted. The light module(s) 260 can be configured send control signals or commands 201 over a communication network (e.g., the communication network(s) 140) to the light 400 or one or more components thereof. Non-limiting examples of the output characteristic of the light 400 can include intensity, propagation-direction, frequency, wavelength, polarization, color, mode (steady, intermittent, etc.), beam width, and/or any combination thereof, just to name a few possibilities.

When the light 400 is configured to change colors, each color can, in some instances, have a different meaning. As a non-limiting example, white can be used for general lighting. Green light can indicate good or an acceptable condition. Red can indicate the need for an electrician (or other specific type of worker/job) or can indicate that one or more item(s) requires attention. Yellow light can indicate the need for a pipe fitter (or other specific type of worker/job). The robotic programmers or technicians, a company, or a customer can determine or assign the meaning of the different colors as they desire.

When the light 400 is configured so that the width of the light beam can be adjusted, the light output can be widened or narrowed as a user needs it. The width of the beam can be adjusted on the teach pendant 200 or manually on the light 400 itself.

It will be appreciated that it may be desirable to locate the light 400, such as when the light 400 is separated from the teach pendant 200 and/or the robot 300. In such case, the light module(s) 260 can be configured to send a location alarm request to the light 400. For instance, the light module(s) 260 can be configured to detect and/or receive user inputs corresponding to a location alarm request. In response, the light module(s) 260 can be configured to cause a location alarm command to be sent to the light 400, which, in turn, can be activated to signal its location in one or more ways. For example, the light 400 can signal its location by one or more sounds, one or more vibrations, and/or one or more lights (e.g., flashing lights). Thus, the teach pendant 200 can assist a user in locating the light 400.

In one or more arrangements, the teach pendant 200, the robot 300, and/or the light 400 can include a global positioning system, a local positioning system or a geolocation system. These aspects can be implemented with any one of a number of satellite positioning systems, now known or later developed, including, for example, the United States Global Positioning System (GPS). Further, the teach pendant 200, the robot 300, and/or the light 400 can use Transmission Control Protocol (TCP) and/or a Geographic information system (GIS) and location services. The teach pendant 200, the robot 300, and/or the light 400 may include a transceiver configured to estimate a position of the light 400 with respect to the Earth. For example, the teach pendant 200, the robot 300, and/or the light 400 can include a GPS transceiver to determine the location of the light 400. The teach pendant 200, the robot 300, and/or the light 400 can use other systems to determine the location of the light 400.

Figure 3:
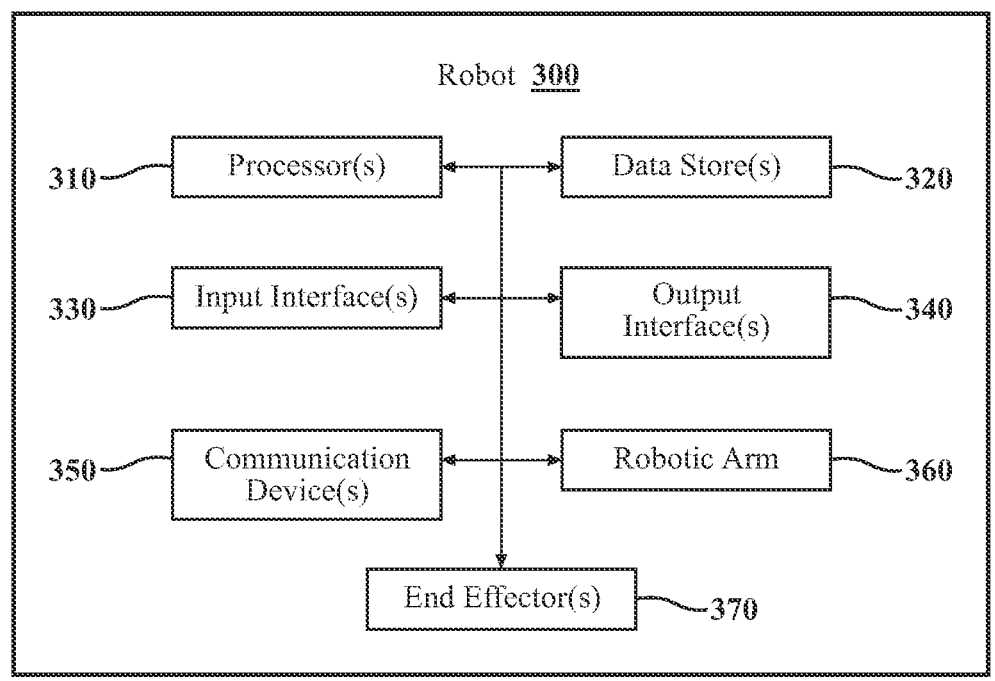
FIG. 3 is an example of a robot.

Referring to FIG. 3, an example of the robot 300 is shown. The robot 300 can be any type of robot, now known or later developed. The robot 300 can be configured to perform one or more functions.

Some of the possible elements of the robot 300 are shown in FIG. 3 and will now be described. It will be understood that it is not necessary for the robot 300 to have all of the elements shown in FIG. 3 or described herein. The robot 300 can include one or more processors 310, one or more data stores 320, one or more input interfaces 330, one or more output interfaces 340, and one or more communication devices 350. The above discussion of the processor(s) 210, the data store(s) 220, the input interface(s) 230, the output interface(s) 240, and the communication device(s) 250 made in connection with the teach pendant 200 apply equally to the processor(s) 310, the data store(s) 320, the input interface(s) 330, the output interface(s) 340, and the communication device(s) 350 of the robot 300.

The robot 300 can have any suitable configuration. For instance, in one or more arrangements, the robot 300 can be or include a robotic arm 360 or other structure. The robotic arm 360 can be any suitable type of robotic arm, now known or later developed. The robotic arm 360 can be programmable and/or controllable. The robotic arm 360 can perform similar functions to a human arm. The robotic arm 360 can be the entire robot 300, or the robotic arm 360 can be a portion of the robot 300. The robotic arm 360 can include a plurality of segments. The segments can be connected by joints that allow for movement of the segments. For instance, the joints can allow for rotational motion and/or translational motion of the segments. The segments can form a kinematic chain.

In some arrangements, the robot 300 can include one or more end effectors 370. The end effector(s) 370 can be operatively connected to any suitable portion of the robot 300, such as to the robotic arm 360 and, more particularly, to an end of the robotic arm 360. Any suitable type of end effector(s) 370 can be used. In one or more arrangements, the end effector(s) 370 can be a gripper. In one or more arrangements, the end effector(s) 370 can be a tool. Example of tools can be a welding head, spray paint gun, a surgical tool (e.g., a scalpel), a drill, or milling cutters, just to name a few possibilities.

Figure 8:
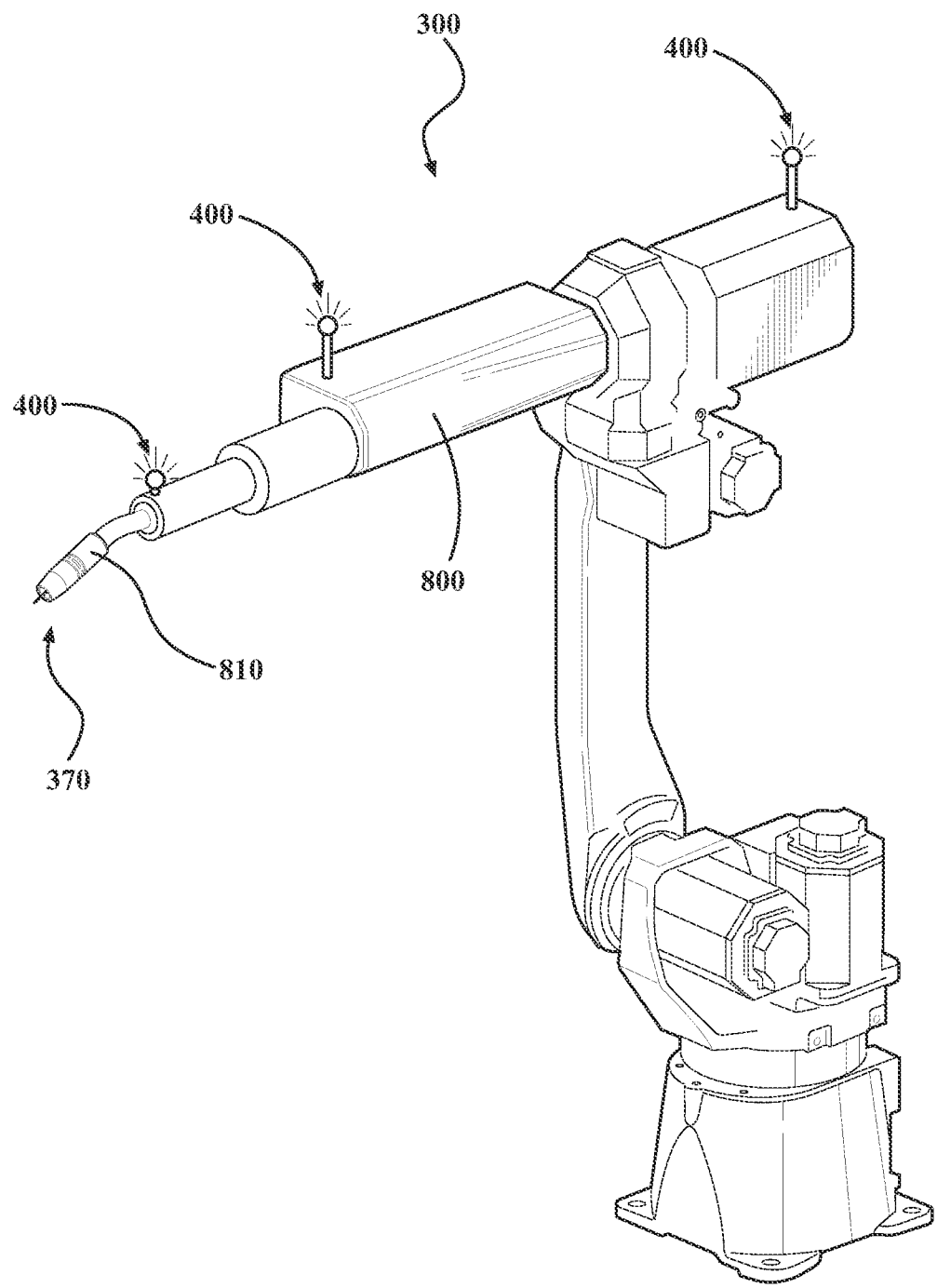
FIG. 8 is an example of a robot with a plurality of lights.

Referring to FIG. 8, an example of the robot 300 is shown. In this example, the robot 300 can be a robotic arm 800 and can include a weld gun 810 as the end effector 370. Here, a plurality of lights 400 can be attached to the exterior of the robotic arm 800. The plurality of lights 400 can be independently controllable. The plurality of lights 400 can be distributed on the robotic arm 800 in any suitable manner. In some arrangements, one or more of the plurality of lights can be fixed to the robotic arm 800. In some arrangements, one or more of the plurality of lights 400 can be removably attached to the robotic arm 800. In an alternative arrangements, the robotic arm 800 can include a single light 400 that is removably attached to the robotic arm 800. In such case, the light 400 can be moved to the different locations shown in FIG. 8 as an example and reattached to the robotic arm 800 in such locations.

Figure 4:
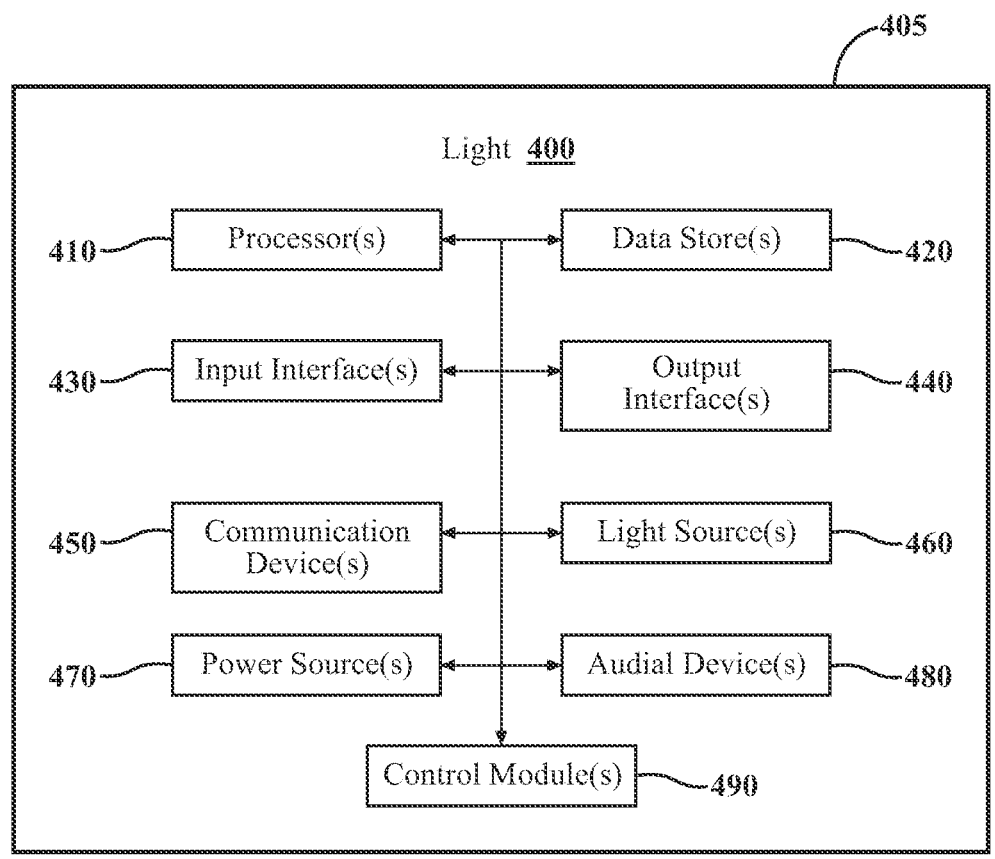
FIG. 4 is an example of a light.

Referring to FIG. 4, an example of the light 400 is shown. The light 400 can be configured to emit a light beam, light beams, or a light field. The light 400 can be configured so that one or more output characteristics of the light is adjustable. Some of the possible elements of the light 400 are shown in FIG. 4 and will now be described. It will be understood that it is not necessary for the light 400 to have all of the elements shown in FIG. 4 or described herein. The light 400 can include one or more processors 410, one or more data stores 420, one or more input interfaces 430, one or more output interfaces 440, one or more communication devices 450, one or more light sources 460, one or more power sources 470, one or more audial devices 480, and one or more control modules 490. One or more of the elements of the light 400 can reside within a housing 405.

The above discussion of the processor(s) 210, the data store(s) 220, the input interface(s) 230, the output interface(s) 240, and the communication device(s) 250 in connection with the teach pendant 200 apply equally to the processor(s) 410, the data store(s) 420, the input interface(s) 430, the output interface(s) 440, and the communication device(s) 450 of the light 400. The light 400 can include one or more features to enable a user to turn the light 400 on or off. Alternatively or additionally, a user can turn the light 400 on or off by the teach pendant 200.

The light source(s) 460 can generate or emit any type of light energy. In one or more arrangements, the light source(s) 460 can be electric-powered. The light source(s) 460 can be any type of light source, now known or later developed. In one or more arrangements, the light source(s) 460 can be light emitting diodes (LEDs), one or more incandescent lights, one or more halogen lights, one or more fluorescent lights, and one or more compact fluorescent lamps.

The light 400 can include one or more power sources 470. The power source(s) 470 can be any suitable source of electrical power for the light source(s) 460. In one or more arrangements, the power source(s) 470 can include one or more batteries. The power source(s) 470 can be operatively connected to supply and/or selectively supply electrical energy to the light source(s) 460.

The light 400 can include one or more audial devices 480. "Audial device" includes any element, device, component and/or system, now known or later developed, that can generate, produce, and/or provide an audial alert. "Audial alert" is any output that is perceptible to the human sense of hearing. The audial device(s) 480 can audibly alert a person of the location of the light 400. The audial device(s) 480 can include one or more speakers, electroacoustic transducers, sound chips, and/or sound cards. It will be appreciated that, alternatively or additionally, the light 400 can include one or more visual devices and/or haptic devices. The visual devices can include any element, device, component and/or system, now known or later developed, that can generate, produce, and/or provide a visual alert. "Visual alert" is any output that is perceptible to the human sense of sight. The haptic devices can include any element, device, component and/or system, now known or later developed, that can generate, produce, and/or provide a haptic alert. "Haptic alert" is any output that is perceptible to the human sense of touch.

The light 400 can include one or more control module(s) 490. The control module(s) 490 can be configured to receive commands from the teach pendant 200. Such commands can be sent by the teach pendant 200 in response to a user input on the teach pendant 200, such as on one of the input interface(s) 230.

In one or more arrangements, the command can be a light activation or a light deactivation command. In response to receiving a light activation command, the control module(s) 490 can be configured to cause the light 400 to be activated. As an example, the control module(s) 490 can be configured to allow electrical energy from the power source(s) 470 to be supplied to the light source(s) 460. In response to receiving a light deactivation command, the control module(s) 490 can be configured to cause the light 400 to be deactivated. As an example, the control module(s) 490 can be configured to discontinue the supply of electrical energy from the power source(s) 470 to the light source(s) 460.

In one or more arrangements, the command can be a command to adjust one or more characteristics of a light output from the light 400. In response to receiving such a command, the control module(s) 490 can be configured to cause the characteristic of the light output from the light 400 to be adjusted. Any characteristic of the light output of the light 400 can be adjusted. One example of the characteristic can include the color of the light. Another example of the characteristic can include the width of the light beam emitted from the light 400.

In one or more arrangements, the command can be a location request. In such case, a user may want to locate the light 400. In response to receiving such a command, the control module(s) 490 can be configured to cause a location alarm to be emitted by the light 400. The location alarm can be any suitable type of alarm. For example, the location alarm can be an audial alarm. In such case, the control module(s) 490 can cause the audial device(s) 480 to be activated so as to emit sounds. However, it will be appreciate that other type of location alarms—visual, haptic, or olfactory—can be given by the light 400 alternatively or in addition to an audial alarm. In one or more arrangements, the location alarm can include one or more lights or one or more flashing lights. In one or more arrangements, the location alarm can include one or more vibrations. In one or more arrangements, the location alarm can include one or more scents. In some arrangements, the location of the light 400 can be displayed on the teach pendant 200 or some other user interface. For instance, the location of the light 400 can be displayed on a map. In some instances, the map can be of the particular work environment.

Figure 6:
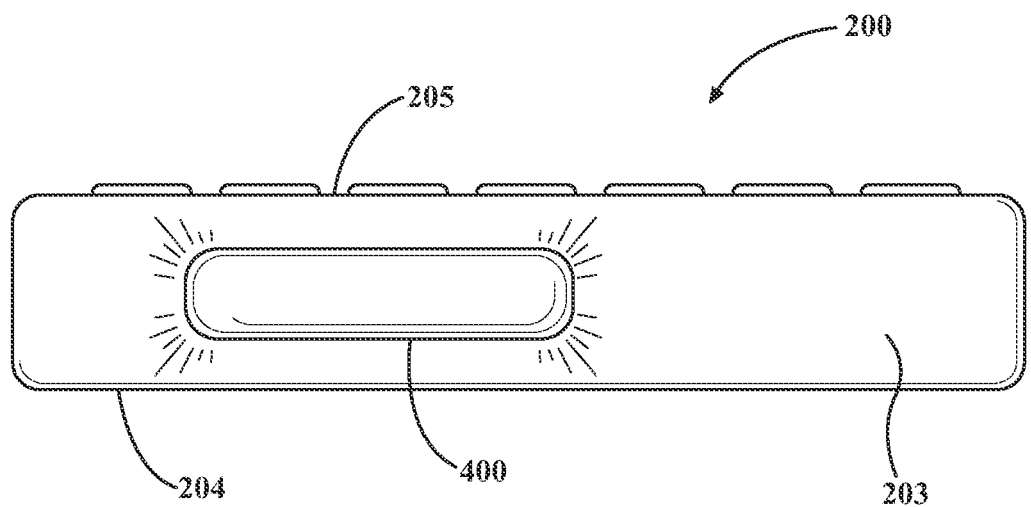
FIG. 6 is an example of a teach pendant with an integrated light.
Figure 7:
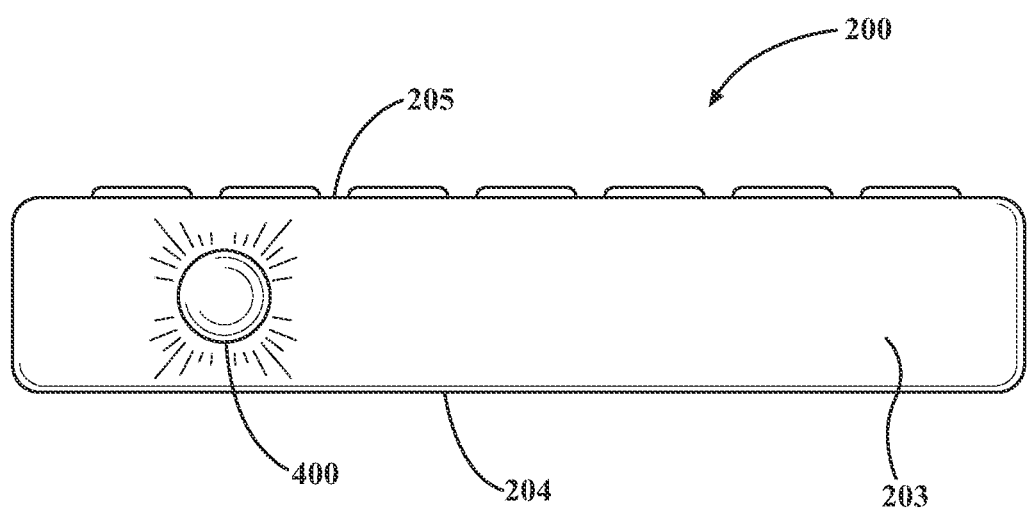
FIG. 7 is an example of a teach pendant with an integrated light.

Some examples of the light 400 are shown in FIGS. 6 and 7. In these examples, the light 400 can be integrated into the teach pendant 200, such as by being casted or molded therein. As a result, the light 400 is not removable from the teach pendant 200. The light 400 can be provided in any suitable location on the teach pendant 200. For instance, as shown in FIGS. 6 and 7, the light 400 can be provided on a front side 203 of the teach pendant 200. However, it will be appreciated that, alternatively or additionally, the light 400 can be provided on other sides or areas of the teach pendant 200. As an example, the light 400 can be provided on a back face 204, which can be opposite to a front face 205 on which the input interface(s) 230 are provided. The light 400 can be provided on a face, side, or area of the teach pendant 200 that faces away from and in a forward direction from a user holding the teach pendant 200 is its normal operational orientation. Thus, when activated, the light 400 can illuminate a space in front of the user. It will be appreciated that the particular location of the light 400 shown in FIGS. 6 and 7 is merely provided as an example. Arrangements described herein are not limited to any particular location. The light 400 can be provided in any suitable location on the teach pendant 200. Also, as can be seen from FIGS. 6 and 7, the light 400 can have any suitable size, shape, and/or configuration. FIG. 6 shows an example of an obround shaped light, and FIG. 7 is an example of a circular shaped light.

Now that the various potential systems, devices, elements and/or components have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 5:
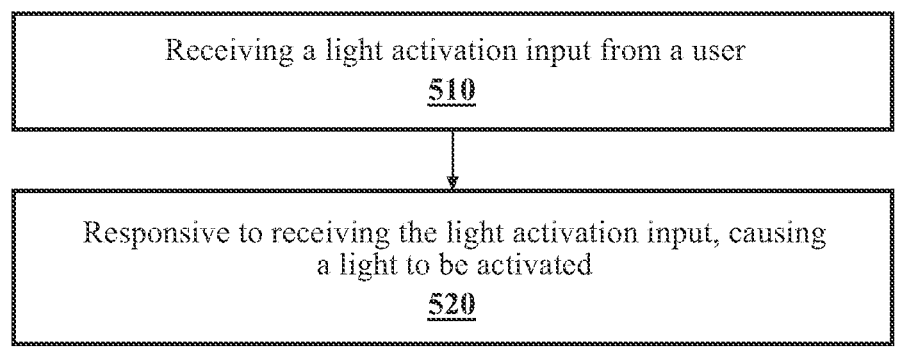
FIG. 5 is an example of a teach pendant light method.

Turning to FIG. 5, an example of a method 500 is shown. At block 510, a light activation input from a user can be received. The user can provide the light activation input using the input interface(s) 230 of the teach pendant 200. The light activation input can be received by the light module(s) 260 and/or the processor(s) 210. The method 500 can continue to block 520.

At block 520, in response to receiving the light activation input, a light 400 can be caused to be activated. The light 400 can be located on the teach pendant 200 or a robot 300 communicatively coupled to the teach pendant 200. In some instances, the light 400 may be remote from the teach pendant 200 or the robot 300. The light module(s) 260 and/or the processor(s) 210 can cause the light to be activated. For instance, the light module(s) 260 and/or the processor(s) 210 can send a light activation command to the light 400.

The method 500 can end. Alternatively, the method 500 can return to block 510 or some other block. As a further alternative, the method 500 can include additional and/or alternative blocks. For instance, the method 500 can include receiving a user input to adjust a characteristic of a light output from the light 400. The user can provide the light activation input using the input interface(s) 230 of the teach pendant 200. The light activation input can be received by the light module(s) 260 and/or the processor(s) 210. Responsive to receiving the user input to adjust a characteristic of a light output from the light 400, the method can include causing the characteristic of the light output from the light 400 to be adjusted. Such causing can be performed by the light module(s) 260 and/or the processor(s) 210.

As another example, the method 500 can include receiving, on the teach pendant 200, a user input for a location request for the light 400. The user can provide the light activation input using the input interface(s) 230 of the teach pendant 200. The light activation input can be received by the light module(s) 260 and/or the processor(s) 210. Responsive to receiving the location request, the method 500 can include causing a location alarm to be emitted by the light 400. Such causing can be performed by the light module(s) 260 and/or the processor(s) 210. The location alarm can be emitted by the audial device(s) 480.

It will be appreciated that arrangements described herein can provide numerous benefits, including one or more of the benefits mentioned herein. For example, arrangements described herein can facilitate user safety as the light can illuminate work environments, which can help users to see while moving around in work environments. Arrangements described herein can help users to see where they are walking and/or what they are working on. Arrangements described herein can assist in lighting to enable robotic programmers, technicians, or other works to see is programming/repair/work areas that are in a dark or dimly lighted robotic work cell, fabrication shop, manufacturing facilities, etc. Arrangements described herein can facilitate quicker programing, setup times, and/or a smaller number of programmers required for the programing task(s). Arrangements described herein can help to ensure a safe work environment. Arrangements described herein can help robotic programmers, operators, and/or technicians see in dark or dimly light work environments. Arrangements described herein can reduce or eliminate the need for a person holding a teach pendant to also carry a separate light or be followed by someone carrying a light. Arrangements, described herein can provide helpful signals to users, as the color of light output from the light can indicate a particular condition or working environment. Arrangements described herein can provide flexibility in light usage in terms of light location and/or output characteristics. Arrangements described herein can be a safety feature on all types of teach pendant devices. Thus, at least in some arrangements, the light can be considered to be a safety light.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A teach pendant system comprising:
a teach pendant including:
one or more processors;
an input interface provided on a first side of the teach pendant, the input interface being operatively connected to the one or more processors; and
a light physically connected to the teach pendant, the light being not removable from the teach pendant, the light being operatively connected to the one or more processors, the light being provided on a second side of the teach pendant, the first side and the second side being angled relative to each other,
the one or more processors being configured to selectively activate and deactivate the light responsive to receiving a light activation or deactivation command on the input interface, whereby, when the light is activated, the light illuminates a work environment in front of a user of the teach pendant.

2. The teach pendant of claim 1, wherein the light is fixed on the teach pendant.

3. The teach pendant of claim 1, wherein the light is movable on the teach pendant.

4. The teach pendant of claim 3, wherein the light is configured for swivel on the teach pendant.

5. The teach pendant system of claim 1, wherein the first side and the second side are angled at substantially 90 degrees relative to each other.

6. The teach pendant system of claim 1, wherein an output characteristic of the light is adjustable by the one or more processors responsive to a light adjustment input on the input interface, and wherein the output characteristic is one of intensity, propagation-direction, wavelength, frequency, polarization, mode, and beam width.

7. The teach pendant system of claim 1, wherein an output characteristic of the light is adjustable, wherein the output characteristic is a color of the light, and wherein the one or more processors are further configured to: when a light adjustment command is received on the input interface while the light is activated, cause the output characteristic of the light to be adjusted.

8. A teach pendant system comprising:
a teach pendant, the teach pendant including:
an input interface provided on a first side of the teach pendant;
a light operatively connected to the teach pendant, the light being configured so that an output characteristic of the light is adjustable, the output characteristic being a beam width of the light; and
one or more processors operatively connected to the input interface and to the light, the one or more processors being configured to:
when a light activation or deactivation command is received on the input interface, selectively activate and deactivate the light, whereby, when the light is activated, the light illuminates a work environment in front of a user of the teach pendant; and
when a light adjustment command is received on the input interface while the light is activated, cause the output characteristic of the light to be adjusted.

9. The teach pendant system of claim 8, wherein the light is provided on a second side of the teach pendant, and wherein the first side and the second side are different.

10. The teach pendant system of claim 9, wherein the first side and the second side are angled relative to each other.

11. The teach pendant system of claim 9, wherein the first side and the second side are on opposite sides of the teach pendant.

12. The teach pendant system of claim 11, wherein the first side is a front face of the teach pendant, and wherein the second side is a back face of the teach pendant.

13. The teach pendant of claim 8, wherein the light is movable on the teach pendant.

14. A teach pendant system comprising:
a teach pendant including:
an input interface provided on a first side of the teach pendant;
a light physically connected to the teach pendant, the light being removable from the teach pendant, whereby the light is usable independently from the teach pendant, the light including an audial device; and
one or more processors operatively connected to the input interface and to the light, the one or more processors being configured to:
when a light activation or deactivation command is received on the input interface, selectively activate and deactivate the light, whereby, when the light is activated, the light illuminates a work environment in front of a user of the teach pendant; and
when a location alarm request is received on the input interface while the light is removed from the teach pendant, cause the audial device to emit an audible location alarm, whereby the audible location alarm helps a user to locate the light; and
when the light is removed from the teach pendant, cause a program to be disabled, suspended, or not run.

15. The teach pendant system of claim 14, wherein, when the light is physically connected to the teach pendant, the light is located on a second side of the teach pendant, and wherein the first side and the second side are different.

16. The teach pendant system of claim 15, wherein the first side and the second side are angled relative to each other.

17. The teach pendant system of claim 15, wherein the first side and the second side are on opposite sides of the teach pendant.

18. The teach pendant system of claim 14, wherein an output characteristic of the light is adjustable, wherein the output characteristic is one of intensity, propagation-direction, wavelength, frequency, polarization, mode, and beam width, and wherein the one or more processors are further configured to: when a light adjustment command is received on the input interface while the light is activated, cause the output characteristic of the light to be adjusted.

19. The teach pendant system of claim 14, wherein an output characteristic of the light is adjustable, wherein the output characteristic is a color of the light, and wherein the one or more processors are further configured to: when a light adjustment command is received on the input interface while the light is activated, cause the output characteristic of the light to be adjusted.

* * * * *